(12) United States Patent
Karst et al.

(10) Patent No.: US 6,235,988 B1
(45) Date of Patent: May 22, 2001

(54) WALL PANEL ASSEMBLY

(75) Inventors: Ronald E. Karst, Kendallville; Edward J. Keil, Rome City; James M. Busé, Auburn; Donald E. DeWitt, Syracuse, all of IN (US)

(73) Assignee: Pent Assemblies, Inc., Kendallville, IN (US)

( * ) Notice: Subject to any disclaimer, the term of this patent is extended or adjusted under 35 U.S.C. 154(b) by 0 days.

(21) Appl. No.: 09/322,529

(22) Filed: May 28, 1999

(51) Int. Cl.[7] ....................................................... H02G 3/10
(52) U.S. Cl. .......................... 174/48; 174/68.1; 52/220.7; 439/207
(58) Field of Search ............................. 174/48, 37, 68.1, 174/68.2, 101, 49, 95; 52/220.7, 220.1; 439/207, 210

(56) References Cited

U.S. PATENT DOCUMENTS

| | | | |
|---|---|---|---|
| 3,707,817 | * | 1/1973 | Schmitt et al. ................. 52/220.1 X |
| 3,725,568 | * | 4/1973 | Stanley .................................... 174/48 |
| 4,308,418 | * | 12/1981 | Van Kuik et al. ..................... 174/48 |
| 4,899,018 | * | 2/1990 | Sireci ..................................... 174/48 |
| 4,922,672 | * | 5/1990 | Bartee et al. ........................ 52/220.1 |
| 4,952,163 | * | 8/1990 | Dola et al. ............................. 174/48 |
| 5,162,614 | * | 11/1992 | Bogiel et al. .......................... 174/97 |
| 5,357,055 | * | 10/1994 | Sireci ............................... 52/220.7 X |
| 5,789,705 | * | 8/1998 | Cancellieri et al. ................... 174/59 |
| 5,861,576 | * | 1/1999 | Langston et al. ...................... 174/48 |
| 5,962,809 | * | 10/1999 | Duvall et al. .......................... 174/37 |
| 5,969,292 | * | 10/1999 | Snider, Jr. et al. .................... 174/48 |
| 6,017,228 | * | 1/2000 | Verbeek et al. ...................... 439/142 |
| 6,134,844 | * | 10/2000 | Cornell et al. ........................... 52/29 |

\* cited by examiner

Primary Examiner—Anthony Dinkins
Assistant Examiner—Adolfo Nino
(74) Attorney, Agent, or Firm—Taylor & Aust, P.C.

(57) ABSTRACT

A wall panel assembly for use in an office environment includes a wireway which is attached to a wall panel. The wireway includes two side walls, a top wall, a bottom wall and a raceway defining a conduit for electrical power conductors. The raceway is positioned between the side walls and extends between and interconnects the top wall and the bottom wall. The raceway structurally supports the wireway.

20 Claims, 3 Drawing Sheets

WALL PANEL ASSEMBLY

BACKGROUND OF THE INVENTION

1. Field of the Invention

The present invention relates to modular wall panels, and, more particularly, to wall panels with a wireway for power or data cables.

2. Description of the Related Art

A modular wall panel assembly, also known as a partition or divider, is used in an office environment to define and separate work stations for individual workers. Such a wall panel assembly typically includes a wall panel with a wireway located at the bottom of the wall panel. The wireway is used to carry an electrical distribution harness which connects with an electrical distribution harness in an adjacent wall panel assembly. Electrical power may thus be distributed to the individual work stations through the electrical harness assemblies located in the modular wall panel assemblies.

With a typical wall panel assembly, the electrical distribution harness is manufactured as a separate and distinct component with its own casing, connectors and attachment brackets. The attachment brackets typically include holes therein through which screws or the like extend to fasten the electrical distribution harness assembly to the bottom side of the wall panel to which the wireway is attached. This is a relatively time consuming process. Additionally, an installer may be required to kneel or lay on the floor in order to install the electrical distribution harness within the wireway and screw the distribution harness to the bottom end of the wall panel. This can be uncomfortable for some installers, and even nearly impossible to accomplish for other installers.

For the above reasons, installers sometimes do not take the necessary time to properly attach an electrical distribution harness to the bottom end of a corresponding wall panel. Although this does not affect the electrical integrity of the system, it is not a desirable installation practice.

What is needed in the art is a wall panel assembly with an electrical distribution system which must be installed by an installer in a particular way within the wireway of the wall panel. What is further needed in the art is a wireway in a wall panel assembly, including both the structural supports and electrical distribution system, which is simpler and less expensive to manufacture, and easier to install.

SUMMARY OF THE INVENTION

The present invention provides a wireway in a wall panel assembly with a raceway which is integral with the wireway and structurally supports the wireway.

The invention comprises, in one form thereof, a wall panel assembly for use in an office environment. A wireway is attached to a wall panel. The wireway includes two side walls, a top wall, a bottom wall and a raceway defining a conduit for electrical power conductors. The raceway is positioned between the side walls and extends between and interconnects the top wall and the bottom wall. The raceway structurally supports the wireway.

An advantage of the present invention is that the raceway is integral with the wireway, thereby reducing the number of parts of the wireway and ensuring proper installation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
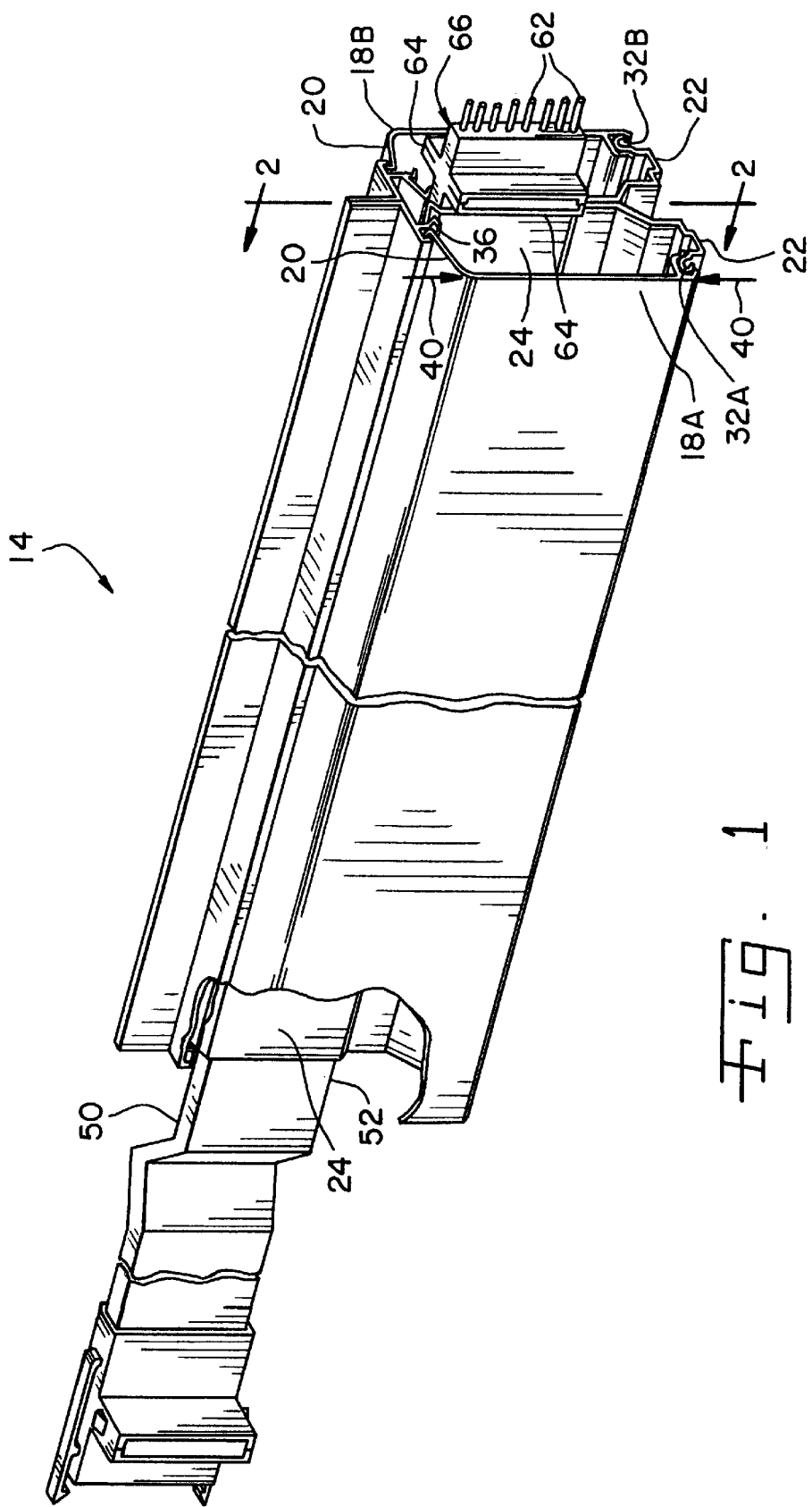
FIG. 1 is a perspective, fragmentary view of an embodiment of a wireway of the present invention.
Figure 2:
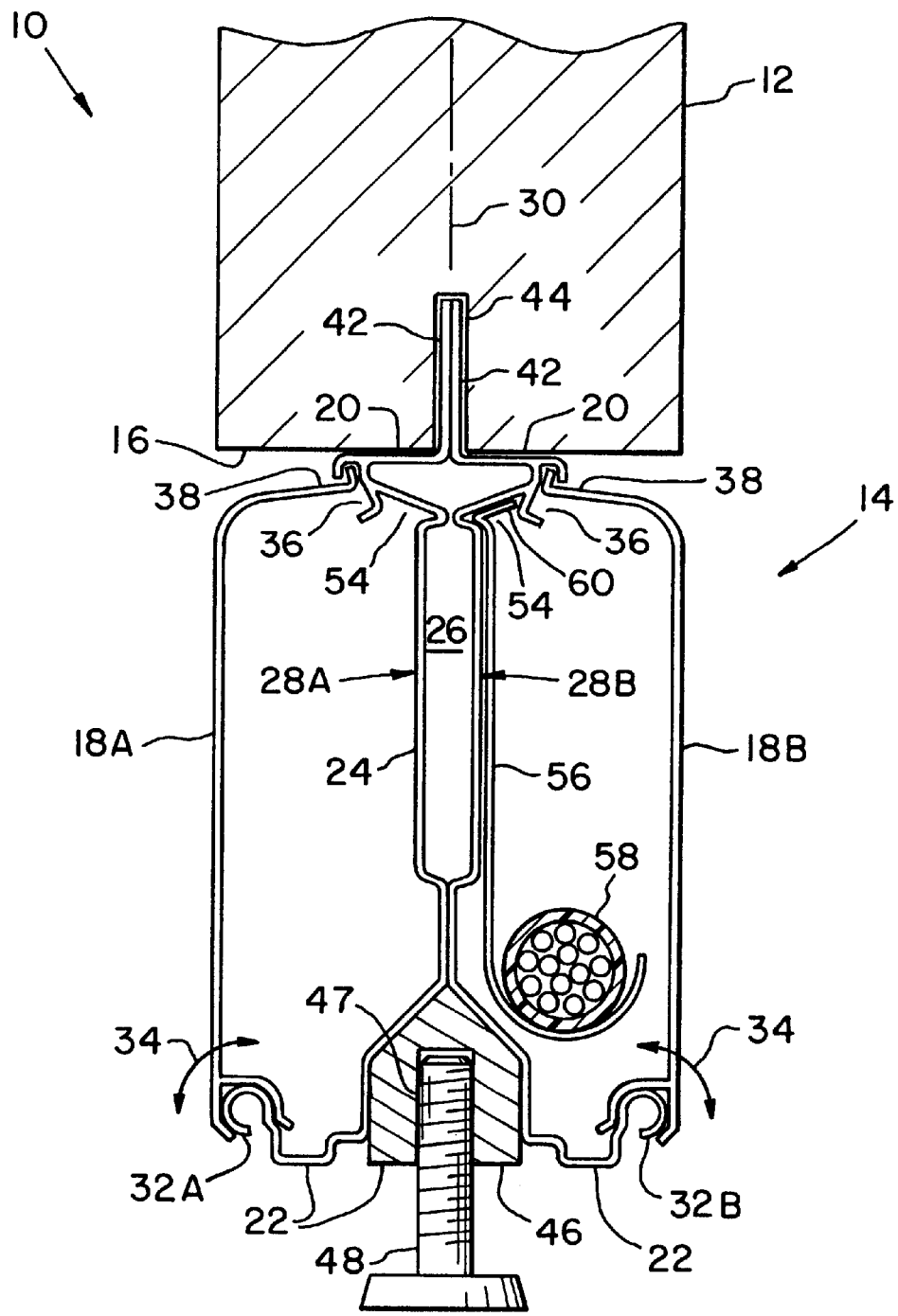
FIG. 2 is an end view of the wireway of FIG. 1 attached to a wall panel.

Referring now to the drawings, and more particularly to FIGS. 1 and 2, there is shown an embodiment of a wall panel assembly 10 of the present invention for use in an office environment. While panel assembly 10 generally includes a wall panel 12 and a wireway 14.

Wall panel 12 defines a divider or partition between adjacent work stations in an office environment. Wall panel 12 includes a suitable frame work, and may be upholstered, etc., in known manner. Wall panel 12 includes a bottom end 16 which attaches with wireway 14.

Wireway 14 is configured to receive power and/or data conductors for transmitting electrical power and/or data signals to and from various work stations within the office environment. Typically, the power conductors are in the form of individual conductors and the data conductors are in the form of a data cable. Wireway 14 generally includes two sidewalls 18A and 18B, a top wall 20, a bottom wall 22 and a raceway 24. Raceway 24 defines an electrical conduit 26 through which electrical power conductors (not shown) extend.

The structural frame work of wireway 14 is principally defined by a pair of extruded plates 28A and 28B which are substantially mirror images of each other and attached together on opposite sides of a plane of symmetry 30. The two plates 28A and 28B conjunctively define top list wall 20, bottom wall 22 and raceway 24. Plates 28A and 28B are preferably formed from an extrusion process in the embodiment shown in FIG. 1, but may also be formed with another suitable bending or forming process, depending upon the specific configuration of wireway 14.

Each plate 28A and 28B includes a hinge 32A and 32B, respectively, which allows a corresponding sidewall 18A and 18B to be pivotally connected with bottom wall 22, as indicated by rotational arrows 34. Each plate 28A and 28B also includes a snap lock recess 36 connected with top wall 20. An opposing top end 38 of each sidewall 18a and 18b is received within a corresponding snap lock recess 36 when in a closed position. Each sidewall 18a and 18b may be pinched together from the top and bottom ends, as indicated by arrows 40, to slightly bow or bend the sidewall 18*a* or 18*b* and allow top end 38 to disengage from the corresponding snap lock recess 36. Sidewalls 18*a* and 18*b* may be formed from any suitable material such as metal or plastic, and are formed from plastic in the embodiment shown in FIG. 1.

Each plate 28A and 28B includes an upwardly extending projection 42 which extends into a slot/shaped cavity 44 in bottom end 16 of wall panel 12. Projections 42 may be retained within slot-shaped cavity 44 using any suitable fastening method, such as adhesive, fasteners, etc.

Wireway 14 also includes a plurality of bosses 46 formed in or attached to plates 28A and 28B which define corresponding openings 47 which extend upwardly from bottom wall 22. Each opening 47 associated with bosses 46 is internally threaded or receives a threaded fastener for attachment with a corresponding adjustable threaded leg 48 which supports and allows leveling of wall panel assembly 10. With conventional wall panel assemblies, adjustable legs are provided which merely extend through the wireway and attach to and directly support the wall panel above the wireway. In contrast, the present invention provides adjustable legs 48 which attach to and directly support the wireway, which in turn indirectly supports wall panel 12. Since the adjustable legs attach directly to the bottom of wireway 14, the legs may be more easily assembled and adjusted when compared with the internal attachment and adjustment at the bottom of a wall panel inside the wireway which is required with a conventional wall panel assembly.

Raceway 24 may be sized and configured to attach with a flexible panel-to-panel interconnect 50 allowing the electrical power circuits within adjacent wall panel assemblies 10 to be connected together. Panel-to-panel interconnect 50 includes an end 52 which may be disposed within conduit 26, and which may be attached to raceway 24 in any suitable manner such as by using an adhesive, fasteners, snap lock interconnection, overmolding, etc.

Each plate 28A and 28B includes a hanger recess 54 positioned above raceway 24. A plurality of data cable brackets 56 may be placed at any desired position along the length of wireway 14 to support a corresponding data cable 58 therein. Each data cable bracket 56 is inserted within hanger recess 54 by first placing a distal end 60 within hanger recess 54 and then pivoting data cable bracket 56 to the position shown in FIG. 2. Data cable bracket 56 may have any suitable length so that data cable 58 is positioned at a selected height within wireway 14. In the embodiment shown in FIG. 2, data cable bracket 56 has a length which allows data cable 58 to be positioned below raceway 24. This configuration is advantageous if an electrical receptacle or other electrical device is plugged into a connector 64 extending from raceway 24, such that data cable 58 is disposed below and out of the way of the electrical receptacle device.

Plates 28A and 28B may be formed with a plurality of cutouts (not shown) which are aligned with each other on generally opposite sides of raceway 24. The cutouts allow respective breakout connectors 64 of a connector assembly 66 to extend therethrough. Breakout connectors 64 allow attachment between an electrical receptacle or other desired electrical device and the electrical conductors 62 within conduit 26. Breakout connectors 64 are preferably fed in a parallel manner from electrical conductors 62 within raceway 24. Breakout connectors 64 may have any suitable plug-in configuration, and preferably are non-handed in the embodiment shown so that an electrical receptacle may be plugged in from either direction. Of course, it will be appreciated that a corresponding cutout is formed in a side wall 18A or 18B (not shown) to allow the face plate of the electrical receptacle to extend through wireway 14 for access by a user.

As described above, a conventional wireway attached to the bottom of a wall panel 12 typically includes separate and discrete frame members defining a box-like structure at the bottom of a wall panel assembly in which an electrical distribution harness is disposed. The electrical distribution harness in turn includes mounting brackets which are attached to the bottom end of the wall panel, and does not support the wireway in any manner. The electrical harness defines the raceway through which the power conductors extend, in accordance with certain industry standards. In contrast, wireway 14 combines the functionality of the structurally supporting framework together with the raceway which carries the power conductors. By combining the functionality of both the structurally supporting members and the raceway into a unitary package, simple, cost effective and improved assembly and packaging is provided.

Figure 3:
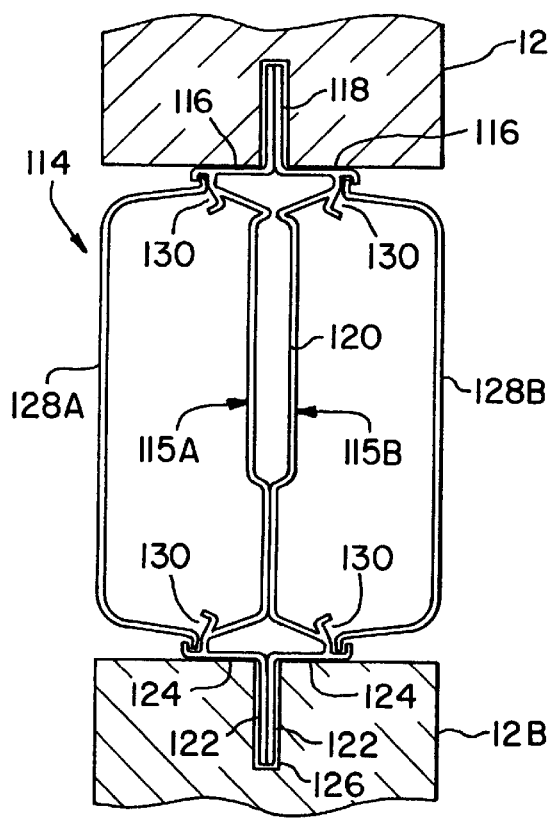
FIG. 3 is an end view of another embodiment of a wireway of the present invention.

FIG. 3 illustrates another embodiment of a wireway 114 of the present invention. Wireway 114 includes two plates 115A and 115B which define a top wall 116, upwardly extending projection 118 and raceway 120, similar to the embodiment of wireway 14 shown in FIG. 2. However, rather than being used at the bottom of a wall panel 12, wireway 114 is used at the belt line between an upper wall panel 12 and a lower wall panel 12B. Plates 115A and 115B each include a projection 122 which extends downwardly from bottom wall 124. Downwardly extending projections 122 are received within a slot-shaped cavity 126 formed in the top of lower wall panel 12B. Side walls 128A and 128B are not pivotally connected to plates 115A or 115B. Rather, each sidewall 128A and 128B includes opposing ends which are received within corresponding snap lock recesses 130 formed in plates 115A and 115B.

Figure 4:
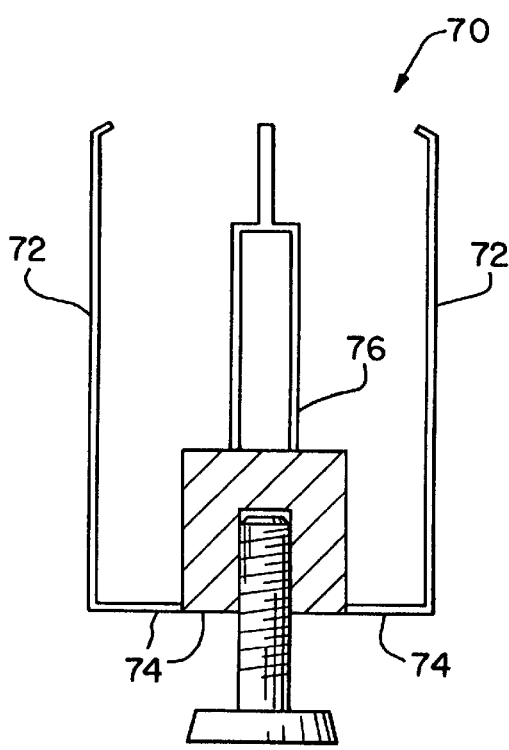
FIG. 4 is an end view of yet another embodiment of a wireway of the present invention.

FIG. 4 illustrates another embodiment of a wireway 70 of the present invention. Wireway 70 includes side walls 72, a bottom wall 74 and a raceway 76, similar to the embodiment of wireway 14 shown in FIG. 1. Additionally, raceway 76 structurally supports wireway 70, similar to the embodiment of wireway 14 shown in FIG. 1. However, wireway 70 differs from wireway 14 in that side walls 72, bottom wall 74 and raceway 76 are unitarily and monolithically formed together using an extrusion process. Wireway 70 does not include a top wall in the embodiment shown. Rather, a lid (not shown) may be provided which attaches to the bottom end 16 of wall panel 12 and interconnects with wireway 70. Alternatively, the wall panel itself may be configured with suitable structure for attaching to the top of wireway 70.

Figure 5:
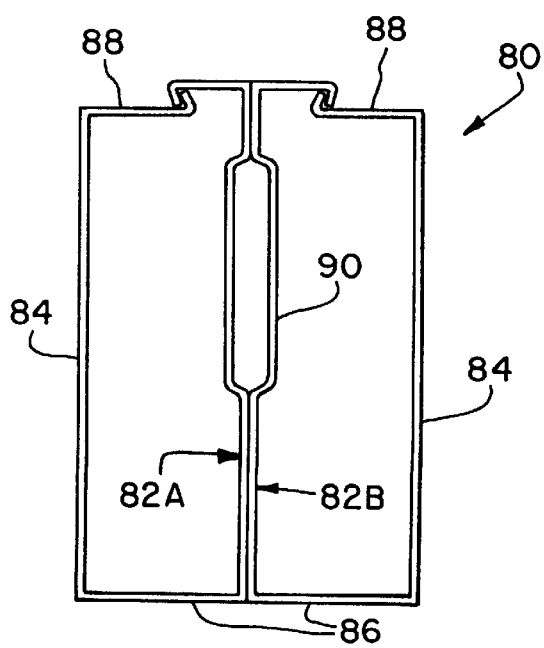
FIG. 5 is an end view of a still further embodiment of a wireway of the present invention.

FIG. 5 illustrates yet another embodiment of a wireway 80 of the present invention. Wireway 80 includes two plates 82*a* and 82*b* which define sidewalls 84, bottom wall 86, top wall 88 and raceway 90, similar to the embodiment of wireway 14 shown in FIG. 1. However, sidewalls 84 are not pivotally connected to bottom wall 86. Rather, sidewalls 84 may be flexed to a certain degree to allow access to the interior of wireway 80. The degree of flexing of each sidewall 84 depends upon the material used, thickness, etc. Alternatively, a living hinge may be used at the juncture of each side wall 84 and bottom wall 86.

Figure 6:
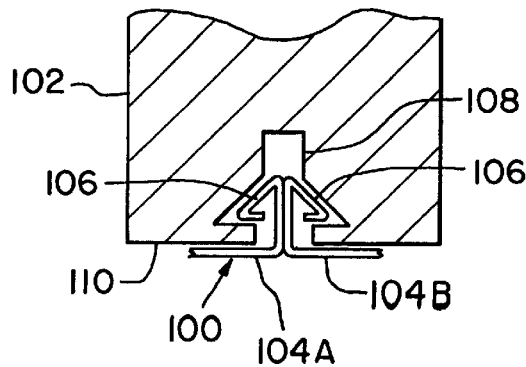
FIG. 6 is a fragmentary end view of a top portion of another embodiment of a wireway of the present invention attached to the bottom end of a wall panel.

FIG. 6 illustrates another method of attaching an embodiment of a wireway 100 of the present invention to a wall panel 102. Wireway 100 includes two plates 104*a* and 104*b* which each have a plurality of quick attach projections 106 spaced along the longitudinal length thereof. Wall panel 102 includes a snap lock cavity 108 formed in a bottom end 110 thereof. Wireway 100 may be attached to wall panel 102 by snap locking quick attach projections 106 into snap lock cavity 108. When projections 106 are moved into snap lock cavity 108, projections 106 deflect inward and then snap out to lock in place within snap lock cavity 108. Wireway 100 may thus be easily and quickly attached with wall panel 102.

In the embodiment of the present invention described above, wireways 14 and 90 are disposed at the bottom and belt line of a wall panel assembly, respectively. It is also to be understood, however, that a wireway of the present invention can be placed at almost any desired location within a wall panel assembly. For example, it can be readily appreciated that wireway 14 can simply be inverted and placed at the top of a wall panel assembly for distribution of power and data at the top of the wall panel. Moreover, it can also be readily appreciated that wireway 90 can be oriented vertically and used to interconnect between side edges of adjacent wall panels. Configured as such, the top and bottom walls of the wireway are synonymous with additional sidewalls since all four structurally supporting walls of the wireway face in a generally horizontal direction. Regardless of the particular orientation of the wireway, the structural support of at least the wireway and possibly also the wall panel are incorporated into the unitary raceway structure of the wireway.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wall panel assembly for use in an office environment, comprising:
   a wall panel; and
   a wireway attached to said wall panel, said wireway including two side walls, a top wall, a bottom wall and a raceway defining a conduit for electrical power conductors, said raceway positioned between said side walls and extending between and interconnecting said top wall and said bottom wall, said raceway structurally supporting said wireway.

2. The wall panel assembly of claim 1, wherein said wireway has a generally vertical plane of symmetry and includes two plates which are attached together on opposite sides of said plane of symmetry, said two plates conjunctively defining said top wall, said bottom wall and said raceway.

3. The wall panel assembly of claim 2, wherein each of said plates has a snap lock recess connected with said top wall, each of said side walls being snap locked together with a corresponding said snap lock recess.

4. The wall panel assembly of claim 2, wherein each of said two plates are structured and arranged to be formed by one of an extrusion process and forming process.

5. The wall panel assembly of claim 1, wherein said raceway is unitarily and monolithically formed with at least one of said bottom wall and said top wall.

6. The wall panel assembly of claim 1, wherein each of said side walls are pivotally connected to one of said bottom wall and said top wall.

7. The wall panel assembly of claim 6, wherein each of said side walls are pivotally connected to said bottom wall via a hinge.

8. The wall panel assembly of claim 1, further comprising a plurality of data cable brackets, each said data cable bracket being removably attached to said raceway.

9. The wall panel assembly of claim 8, wherein said raceway includes a hanger recess, each said data cable bracket being removably attached to said hanger recess.

10. The wall panel assembly of claim 1, wherein said wireway further includes at least one quick attach projection extending from said top wall for connection with said wall panel.

11. The wall panel assembly of claim 10, wherein said wall panel has a bottom end with a snap lock cavity and wherein said at least one quick attach projection comprises a plurality of snap lock projections configured to snap lock into said snap lock cavity in said wall panel.

12. The wall panel assembly of claim 1, wherein said raceway structurally supports each of said wireway and said wall panel.

13. The wall panel assembly of claim 1, wherein said wireway includes a plurality of openings extending upwardly from said bottom wall, and further comprising a plurality of adjustable legs, each said leg disposed in a respective said opening.

14. The wall panel assembly of claim 1, further comprising at least one flexible panel-to-panel interconnect, each said interconnect being attached to said raceway and having an end positioned within said conduit.

15. A wall panel assembly for use in an office environment, comprising:
   a wall panel, and
   a wireway attached to said wall panel, said wireway including two side walls, at least one horizontal wall interconnecting said side walls, said at least one horizontal wall comprising a bottom wall and a top wall, and a raceway defining a conduit for electrical power conductors, said raceway positioned between said side walls and being unitarily formed with said at least one horizontal wall, said raceway extending between and interconnecting said bottom wall and said top wall.

16. A wall panel assembly for use in an office environment, comprising:
   a wall panel; and
   a wireway attached to said wall panel, said wireway including two side walls, at least one horizontal wall interconnecting said side walls, and a raceway defining a conduit for electrical power conductors, said raceway positioned between said side walls and being unitarily formed with said at least one horizontal wall. said raceway structurally supporting said wireway and said wall panel.

17. A wireway for use in a wall panel assembly in an office environment comprising:
   two side walls;
   at least one horizontal wall interconnecting said side walls, said at least one horizontal wall comprising a bottom wall and a top wall; and
   a raceway defining a conduit for electrical power conductors, said raceway being unitary with and extending vertically from said at least one horizontal wall and positioned between said side walls, said raceway extending between and interconnecting said bottom wall and said top wall.

18. A wireway for use in a wall panel assembly in an office environment, comprising:

two side walls;

at least one horizontal wall interconnecting said side walls, said at least one horizontal wall comprising a bottom wall; and a raceway defining a conduit for electrical power conductors, said raceway being unitary with and extending vertically from said at least one horizontal wall and positioned between said side walls, said raceway including a plurality of openings extending upwardly from said bottom wall, each said opening configured to receive a corresponding adjustable leg.

19. A wireway for use in a wall panel assembly in an office environment, comprising:

two side walls;

at least one horizontal wall interconnecting said side walls said wireway having a generally vertical plane of symmetry and including two plates which are attached together on opposite sides of said plane of symmetry, said two plates conjunctively defining each said at least one horizontal wall; and a raceway defining a conduit for electrical power conductors, said raceway being unitary with and extending vertically from said at least one horizontal wall and positioned between said side walls.

20. The wireway of claim 19, wherein said at least one horizontal wall comprises a top wall and a bottom wall, and wherein each of said plates has a snap lock recess connected with said top wall, each of said side walls being snap locked together with a corresponding said snap lock recess.

* * * * *